United States Patent [19]
Godsoe

[11] Patent Number: 4,747,000
[45] Date of Patent: May 24, 1988

[54] MULTIPLE PIVOTED CARTRIDGE RECEIVER

[75] Inventor: Robert J. Godsoe, Tucson, Ariz.

[73] Assignee: International Business Machines Corporation, Armonk, N.Y.

[21] Appl. No.: 789,912

[22] Filed: Sep. 13, 1985

Related U.S. Application Data

[63] Continuation of Ser. No. 433,484, Oct. 8, 1982, abandoned.

[51] Int. Cl.⁴ ............... G11B 5/008; G11B 15/00; G11B 17/00
[52] U.S. Cl. ............................. 360/96.6; 360/90; 360/93; 242/199
[58] Field of Search .................. 360/96.1–96.6, 360/90, 93; 242/197–199

[56] References Cited

U.S. PATENT DOCUMENTS

| | | | |
|---|---|---|---|
| D. 277,851 | 3/1985 | Gresham et al. | D14/11 |
| 3,623,678 | 11/1971 | Housman | 242/198 |
| 3,635,424 | 1/1972 | Morello et al. | 242/198 |
| 3,849,799 | 11/1974 | Nakamichi | 360/96 |
| 3,870,247 | 3/1975 | Carisey | 242/198 |
| 3,902,193 | 8/1975 | Hapke | 360/96 |
| 4,050,087 | 9/1977 | Kishi | 360/95 |
| 4,072,988 | 2/1978 | Sato et al. | 360/96 X |
| 4,107,753 | 8/1978 | Izumikawa | 360/93 |
| 4,303,955 | 12/1981 | Kramer et al. | 360/93 |
| 4,426,047 | 1/1984 | Richard et al. | 342/197 |
| 4,452,406 | 6/1984 | Richard | 360/95 |

FOREIGN PATENT DOCUMENTS

| | | | |
|---|---|---|---|
| 1233160 | 1/1967 | Fed. Rep. of Germany | 360/96.6 |
| 2005738 | 8/1971 | Fed. Rep. of Germany | 360/93 |
| 3136097 | 4/1982 | Fed. Rep. of Germany | 360/96.6 |

Primary Examiner—John H. Wolff
Assistant Examiner—Alfonso Garcia
Attorney, Agent, or Firm—David A. Mims, Jr.; H. S. Somermeyer; M. H. Klitzman

[57] ABSTRACT

A cartridge receiver with a tray pivotally coupled to a cover pivots from a cartridge receiving position to an operating position in a limited amount of vertical space. A cartridge is guided into and properly aligned within the tray in the receiving position and the cover is then closed and the cartridge receiver latched into an operating position. A plunger attached to the cover exerts a downward force on the cartridge when the cover is closed. Pins attached to the frame align and support the cartridge when the cartridge receiver is in an operating position. A threading pin is coupled to the cover and the tray for engaging a cartridge leader block and a bridge is attached to the tray to align the leader block with the threading pin. The leader block is guided back into the cartridge when the tape is rewound. A cartridge present sensor, a file protect sensor, and a latch sensor are also employed as part of the cartridge receiver. In addition, the cartridge receiver has a an unlatching mechanism disengaging the latch and an air dashpot for damping the transition of the receiver from an operating position to a receiving position. A spring is disposed between the tray and the frame for urging the cartridge receiver to pivot from an operating position to a receiving position when the latch is disengaged.

8 Claims, 3 Drawing Sheets

MULTIPLE PIVOTED CARTRIDGE RECEIVER

DESCRIPTION

1. Technical Field

The invention relates to receivers for tape cartridges.

2. Background Art

Various receivers for tape cartridges are known in the art. Several U.S. patents are briefly discussed below which illustrate several of these cartridge receivers.

U.S. Pat. No. 3,870,247 discloses a cassette handling system having a pivotable handler with two fixed pivots at a front portion of a frame or casing. A sliding pivot further couples one of the fixed pivots to a cassette receiver. The cartridge receiver employs ramps and stop elements to guide and hold the cassette in position. Moreover, this cassette receiver includes a sensor for indicating when no cassette is present in the receiver or when the cover is in a cassette loading position. Another double-pivoted cartridge receiver is described in U.S. Pat. No. 3,849,799.

U.S. Pat. No. 3,635,424 discloses a single pivoted receiver for a tape cartridge. The receiver pivots into an operating position for engaging the drive with a reel which is present within the cartridge.

The previous cartridge receiver arrangements share a common problem of requiring a generous amount of vertical space in which to load the receiver with a cartridge. This need for vertical space is often unacceptable in tape units seeking to minimize size and space requirements.

3. Disclosure of the Invention

The cartridge receiver of the present invention includes a tray and a cover coupled to the tray for receiving a tape cartridge. The front of the tray is pivotally coupled to the frame of the tape unit and the back of the cover is also pivotally coupled to the frame. A pair of transversely spaced apart pivot pins are attached to either the tray or the cover. A pair of transversely spaced apart slots for receiving these pivot pins are located in either the tray or cover depending on where the pivot pins are placed (i.e., if the pivot pins are coupled to the cover, the slots are located in the tray and vice versa). These pivot pins and slots are in motion while the tray and cover are moving. A spring means is also located between the tray and the frame for urging the tray and the cover to pivot from an operating position to a cartridge receiving position. Once the cartridge receiver is in the operating position a latch is coupled to a catch to hold the receiver in the operating position. An air dash pot is also provided to soften the transition of the tray from the operating position to the receiving position.

The tray has a central aperture for receiving a tape drive member which is provided to engage a reel contained within the cartridge when the receiver is in an operating position.

The cover of the cartridge receiver also has a plunger attached for holding the received cartridge against the tape drive when the tray is in an operating position.

In order to properly seat the cartridge in the receiver, guide rails and a bridge are integrally formed in the tray. These guide rails also keep the cartridge from contacting the drive clutch which extends through the central aperture. Alignment pins attached to the frame serve to align the cartridge when the tray is in an operating position because these pins are received by associated slots located in the cartridge.

A cartridge present sensor, file protect sensor and a latch sensor are also provided with the cartridge receiver mechanism of the present invention. Furthermore, a leader block slot in the tray allows for tape to move in and out of the tray. A leader block step and a leader block ramp in the tray serve to guide the leader block back into the cartridge when the tape is rewound.

The cartridge receiver of the present invention is manually front loaded. Unloading is with machine release. The dual pivot arrangement accompanied by the intermediate pivot pins minimizes the vertical space required to receive a cartridge and thus is acceptable for tape units seeking to minimize size and space requirements.

BEST MODE FOR CARRYING OUT THE INVENTION

Figure 1:
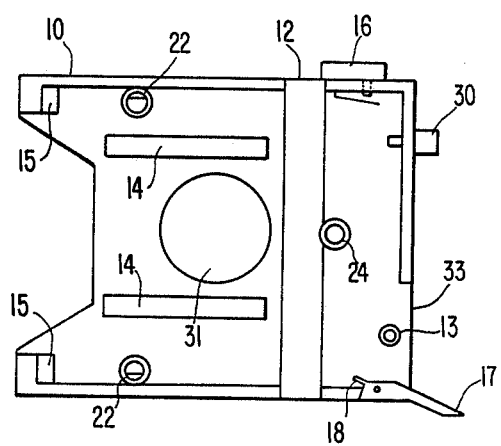
FIG. 1 is a top view of the tray of the cartridge receiver of the present invention.
Figure 2A:
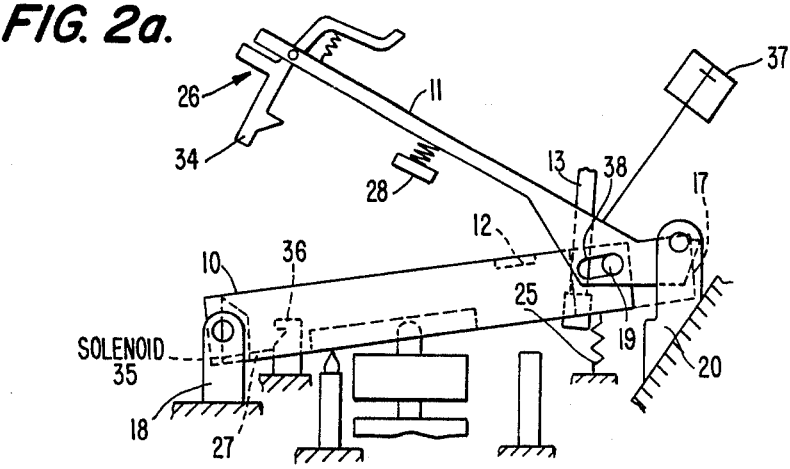
FIGS. 2a, 2b, and 2c are side views of the cartridge receiver of the present invention in the receiving, intermediate and operating positions, respectively.
Figure 2B:
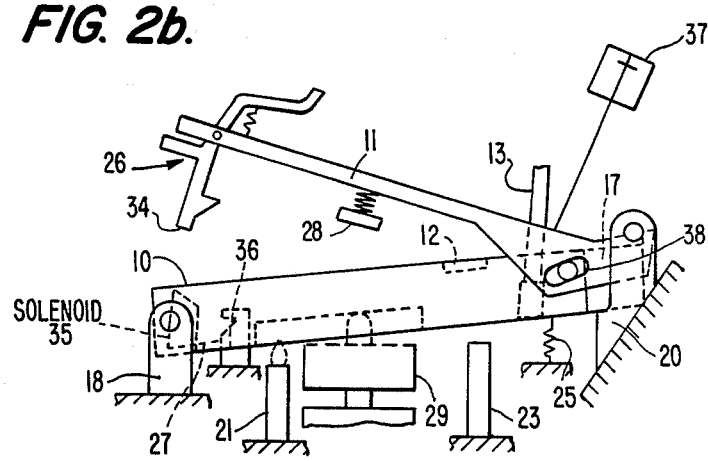
Figure 2C:
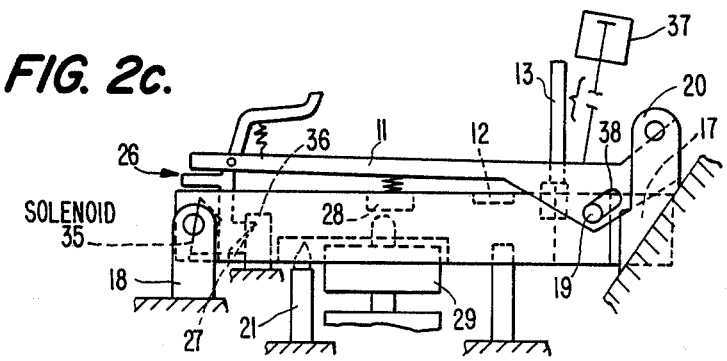
Figure 3A:
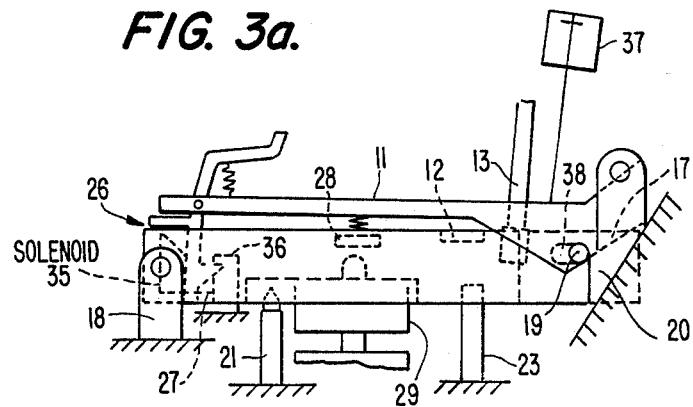
FIGS. 3a, 3b, and 3c are side views of an alternative embodiment of the present invention in the operating, intermediate and receiving positions, respectively.
Figure 3B:
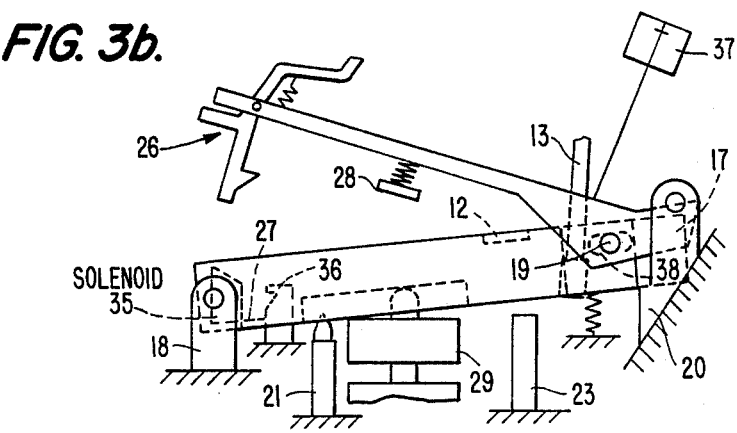
Figure 3C:
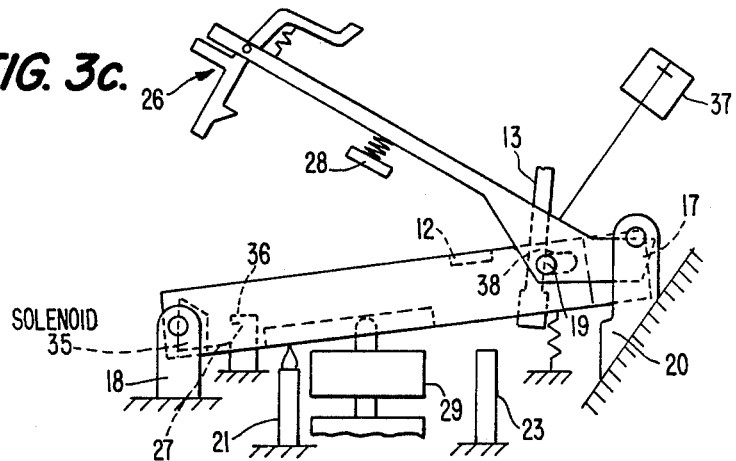

The manual loading cartridge receiver of the present invention includes a tray 10 pivoted at a front pivot 18 and a cover 11 pivoted at a back pivot 20. The height of tray 10 and cover 11 can be such that each can partially receive a cartridge (i.e., the cartridge height is greater than the height of tray 10; furthermore, cover 11 is of a height sufficient to allow the upper portion of the cartridge not contained within tray 10 to reside within cover 11 when the cartridge receiver is in an operating position). The height of tray 10 can also be such that its height is greater than the cartridge height, thereby allowing tray 10 to completely receive the cartridge. Both tray 10 and cover 11 are pivotally coupled to the frame of the tape unit. Tray 10 is also pivotally coupled to cover 11 by pivot pins 19 which ride in mating slots 38. The pivot pins 19 can be located in either tray 10 or cover 11. Mating slots 38 for pivot pins 19 are located in the tray if pivot pins 19 are located in the cover and vice versa. This arrangement of pivots is such that when opening and closing cover 11, tray 10 is raised and lowered. FIG. 2 shows pivot pins 19 located in tray 10 and slots 38 located in cover 11. FIG. 3 shows pivot pins 19 located in cover 11 and slots 38 located in tray 10.

The dual pivot arrangement of the present invention accompanied by intermediate pivot pins 19 limits the vertical space required to receive a cartridge. This requirement for a minimum amount of vertical space in which to load and unload a cartridge is especially important when a cartridge receiver is needed in a tape unit that seeks to minimize size and operating space requirements.

Tray 10 of the present invention also has molded guide rails 14 which prevent the leading edge of the cartridge from encountering drive 29 when a cartridge is loaded into tray 10. As a cartridge is placed in tray 10 the cartridge is guided under bridge 12 so as to properly align the cartridge leader block with threading pin 13. As the cartridge is urged into tray 10, the cartridge also goes over camming ramps 15 located at the front of the tray. Once the cartridge is positioned in the tray spring loaded flag 32 which is mounted to tray 10 is actuated. Flag 32 in turn actuates a cartridge present sensor 16 which is mounted to tray 10. A tray mounted file protect sensor 30 also interacts with the cartridge.

A ramp 17 and a step 18 are located at the back of tray 10. Ramp 17 and step 18 act to guide the leader block back into its proper position in the cartridge when the tape is rewound through the leader block slot 33 in tray 10. Step 18, bridge 12 and camming ramps 15 interact with the cartridge geometry to prevent the cartridge from being incorrectly inserted into tray 10. An opening in the bottom of tray 10 also engages threading pin 13 to position and restrain threading pin 13 during cartridge loading.

When a cartridge is positioned in tray 10, cover 11 is manually closed, the cartridge is lowered onto alignment pins 21 and support pin 23 and threading pin 13 engages the leader block. Alignment pin slots 22 and support pin slot 24 in tray 10 allow alignment pins 21 and support pin 23 to protrude through tray 10 when tray 10 is lowered into operating position. Lowering of tray 10 disengages threading pin 13 from tray 10. Simultaneously the cartridge approaches drive 29 at an angle, thus assuring positive engagement of mating teeth present on the reel within the cartridge with corresponding mating teeth present on the top of drive 29. Alignment pins 21 have protrusions which engage recesses in the cartridge. These protrusions align the cartridge so that the reel is properly centered when engaged with drive 29 through a central aperture 31 in tray 10. Furthermore, alignment pins 21 and support pin 23 provide a positive stop to counteract the force required to latch the leader block in the cartridge. As tray 10 is lowered, a spring 25 is also compressed. In the operating position (i.e., when the cartridge within tray 10 is lowered onto drive 29 and cover 11 is closed) the bottom of tray 10 does not contact the cartridge due to the presence of guide rails 14. This assures proper seating of the cartridge on alignment pins 21 and support pin 23. Tray 10 drops lower than the cartridge since the cartridge rests on alignment pins 21 and support pin 23.

A latch 26 is coupled to cover 11 and cooperates with a catch 36 coupled to the frame. Latch 26 and catch 36 provide for proper closure of cover 11. A latch flag 34 is included on latch 26 to activate a latch sensor 27 which signals that the cartridge is ready for operation. Latch sensor 27 can be attached to the frame, tray 10 or catch 36.

When cover 11 is closed and latched, a spring loaded plunger 28 exerts a sufficient downward force on the cartridge to overcome the hub spring inside the cartridge. This assures proper seating of the cartridge on alignment pins 21 and support pin 23.

Upon issuance of the signal which indicates that the cartridge is ready for operation, tape is threaded into the tape machine. When the tape is rewound and the leader block returned to the cartridge a sensor on the thread mechanism signals and trips solenoid 35 which in turn activates a release link and disengages latch 26. Disengagement of latch 26 allows spring 25 to urge tray 10 upward with a sufficient force to uncouple the cartridge from drive 29 and open cover 11. An air dashpot 37 is also provided to soften the opening. Once the cover is open, the cartridge can be removed. No ejection mechanism is used with the cartridge receiver of the present invention.

Whereas I have illustrated and described the preferred embodiments of my invention, it is to be understood that I do not limit myself to the precise constructions herein disclosed and the right is reserved to all changes and modifications coming within the scope of the invention as defined in the appended claims.

What is claimed is:

1. A data cartridge holder, comprising:
   a frame;
   a tray having a front end and a back end, said tray being pivotally coupled to said frame at the front end of said tray by a front pivot;
   a cover having a front end and a back end and overlying said tray, said cover being pivotally coupled to said frame at the back end of said cover by a back pivot;
   a pair of transversely spaced apart pivot pins coupled to said cover and located between the front end and the back end of said cover, said pivot pins being in motion while said cover is moving;
   a pair of transversely spaced apart slots disposed in said tray for receiving said pivot pins, said slots being in motion while said tray is moving, said slots and said pivot pins forming a single intermediate pivot connection between said tray and said cover which in combination with said front and back pivots raises and lowers said tray to limit the vertical space required in the receiving position;
   a spring means disposed between said tray and said frame for yieldably urging said tray and said cover to pivot from an operating position to a receiving position; and
   a means for latching said tray and said cover in an operating position.

2. A data cartridge holder, comprising:
   a frame;
   a tray having a front end and a back end, said tray being pivotally coupled to said frame at the front end of said tray by a front pivot;
   a cover having a front end and a back end and overlying said tray, said cover being pivotally coupled to said frame at the back end of said cover by a back pivot;
   a pair of transversely spaced apart pivot pins coupled to said tray and located between the front end and the back end of said tray;
   a pair of transversely spaced apart slots disposed in said cover for receiving said pivot pins, said slots being in motion while said cover is moving, said slots and said pivot pins forming a single intermediate pivot connection between said tray and said cover which in combination with said front and back pivots raises and lowers said tray to limit the vertical space required in the receiving position;
   a spring means disposed between said tray and said frame for yieldably urging said tray and said cover to pivot from an operating position to a receiving position; and
   a means for latching said tray and said cover in an operating position.

3. An apparatus according to claims 1 or 2 further including:
   pins attached to said frame for alignment and support; and
   pin slots in said tray for receiving said pins when said tray is in an operating position.

4. An apparatus according to claim 1 or 2 further including:

a latch sensor means for sensing when said tray is held in an operating position.

5. An apparatus according to claim 1 or 2 further including:
a dashpot for softening the transition of said tray from an operating position to a receiving position.

6. An apparatus according to claim 1 or 2 further including:
a means for disengaging said latch means responsive to tape rewound condition.

7. A cartridge receiver comprising:
a frame;
a tray having a central aperture for receiving a drive member, a leader block slot and front end and back end guide members, said tray being pivotally coupled to said frame at the front end of said tray by a front pivot;
a cover having a front end and a back end and overlying said tray, said cover being pivotally coupled to said frame at the back end of said cover by a back pivot;
a pair of transversely spaced apart pivot pins coupled to said cover and located between the front end and the back end of said cover, said pivot pins being in motion while said cover is moving;
a pair of transversely spaced apart slots disposed in said tray for receiving said pivot pins, said slots being in motion while said tray is moving, said slots and said pivot pins forming a single intermediate pivot connection between said tray and said cover which in combination with said front and back pivots raises and lowers said tray to limit the vertical space required in the receiving position;
a spring means disposed between said tray and said frame for yieldably urging said tray and said cover to pivot from an operating position to a receiving position;
a latch means for latching said tray and said cover in an operating position;
guide support rails integrally formed within said tray for preventing contact with said drive member;
alignment and support pins attached to said frame;
alignment and support pin slots in said tray for receiving said alignment and support pins when said tray is in an operating position;
a latch sensor means for sensing when said tray is held in an operating position;
a dashpot for softening the transition of said tray from an operating position to a receiving position; and
a means for disengaging said latch means to return said cover to the receiving position.

8. A cartridge receiver comprising:
a frame;
a tray having a central aperture for receiving a drive member, a leader block slot and front end and back end guide members, said tray being pivotally coupled to said frame at the front end of said tray by a front pivot;
a cover having a front end and a back end and overlying said tray, said cover being pivotally coupled to said frame at the back end of said cover by a back pivot;
a pair of transversely spaced apart pivot pins coupled to said tray and located between the front end and the back end of said tray;
a pair of transversely spaced apart slots disposed in said cover for receiving said pivot pins, said slots being in motion while said cover is moving, said slots and said pivot pins forming a single intermediate connection between said tray and said cover which in combination with said front and back pivots raises and lowers said tray to limit the vertical space required in the receiving position;
a spring means disposed between said tray and said frame for yieldably urging said tray and said cover to pivot from an operating position to a receiving position;
a latch means for latching said tray and said cover in an operating position;
guide support rails integrally formed within said tray for preventing contact with said drive member;
alignment and support pins attached to said frame;
alignment and support pin slots in said tray for receiving said alignment and support pins when said tray is in an operating position;
a latch sensor means for sensing when said tray is held in an operating position;
a dashpot for softening the transition of said tray from an operating position to a receiving position; and
a means for disengaging said latch means to return said cover to the receiving position.

* * * * *